United States Patent
Taniguchi et al.

(10) Patent No.: US 9,951,813 B2
(45) Date of Patent: Apr. 24, 2018

(54) ROLLING BEARING

(71) Applicant: JTEKT CORPORATION, Osaka-shi, Osaka (JP)

(72) Inventors: Youzou Taniguchi, Toyota (JP); Takashi Iwata, Kitakatsuragi-gun (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/379,987

(22) Filed: Dec. 15, 2016

(65) Prior Publication Data

US 2017/0184152 A1 Jun. 29, 2017

(30) Foreign Application Priority Data

Dec. 25, 2015 (JP) ................... 2015-254290

(51) Int. Cl.
*F16C 33/38* (2006.01)
*F16C 33/41* (2006.01)
*F16C 33/66* (2006.01)
*F16C 43/06* (2006.01)
*F16C 19/06* (2006.01)

(52) U.S. Cl.
CPC ........ *F16C 33/3806* (2013.01); *F16C 33/414* (2013.01); *F16C 33/416* (2013.01); *F16C 33/6637* (2013.01); *F16C 33/6681* (2013.01); *F16C 43/065* (2013.01); *F16C 19/06* (2013.01)

(58) Field of Classification Search
CPC . F16C 33/7893; F16C 33/3806; F16C 33/414
See application file for complete search history.

(56) References Cited

U.S. PATENT DOCUMENTS

| | | | | |
|---|---|---|---|---|
| 5,553,949 A | * | 9/1996 | Fukuwaka | ............. F16C 19/06 384/470 |
| RE36,804 E | * | 8/2000 | Kajihara | ............. F16C 33/6603 277/402 |
| 8,746,983 B2 | * | 6/2014 | Mitchell | ............... F16C 19/163 384/470 |
| 9,416,823 B2 | * | 8/2016 | Okamoto | ............ F16C 33/6681 |
| 2011/0069920 A1 | | 3/2011 | Aida | |

FOREIGN PATENT DOCUMENTS

JP 2009-281585 A 12/2009

* cited by examiner

*Primary Examiner* — Thomas R Hannon
(74) *Attorney, Agent, or Firm* — Oliff PLC

(57) ABSTRACT

A rolling bearing includes an inner ring, an outer ring, a plurality of balls, and an annular cage. The cage has an annular portion provided on a first side in an axial direction with respect to the balls and a plurality of cage bars. Pockets that house the balls are each formed between the cage bars adjacent to each other in a circumferential direction. An axially-first-side side surface of the annular portion has a first surface that is inclined toward the first side in the axial direction as the first surface extends outward in a radial direction and a second surface provided outward of the first surface in the radial direction and positioned on the second side in the axial direction with respect to an extended virtual plane of the first surface.

3 Claims, 5 Drawing Sheets (SECOND SIDE IN AXIAL DIRECTION) (FIRST SIDE IN AXIAL DIRECTION)

(SECOND SIDE IN AXIAL DIRECTION)

(FIRST SIDE IN AXIAL DIRECTION)

(SECOND SIDE IN
AXIAL DIRECTION)

(FIRST SIDE IN
AXIAL DIRECTION)

(SECOND SIDE IN AXIAL DIRECTION)

(FIRST SIDE IN AXIAL DIRECTION)

ROLLING BEARING

INCORPORATION BY REFERENCE

The disclosure of Japanese Patent Application No. 2015-254290 filed on Dec. 25, 2015 including the specification, drawings and abstract, is incorporated herein by reference in its entirety.

BACKGROUND OF THE INVENTION

1. Field of the Invention

The invention relates to a rolling bearing.

2. Description of the Related Art

Many rolling bearings are used for various types of industrial equipment. A rolling beating includes an inner ring, an outer ring, a plurality of rolling elements, and a cage. The rolling elements are interposed between the inner ring and the outer ring. The cage holds the rolling elements.

For the rolling bearing, rotational resistance is preferably reduced. For example, a rolling bearing described in Japanese Patent Application Publication No. 2009-281585 (JP 2009-281585 A) is configured to restrain a lubricant in a bearing exterior from entering a bearing interior. That is, the rotational resistance includes a component (stirring resistance) resulting from stirring, by the cage, of a lubricant present in the bearing interior. To reduce the stirring resistance, the lubricant in the bearing exterior is preferably made less likely to enter the bearing interior. Thus, as depicted in FIG. 5, clearances A1, A2 between a cage 93 and each of an inner ring 91 and an outer ring 92 are reduced in size. In this rolling bearing, the cage 93 is a snap cage having an annular portion 94 located on a first side in an axial direction and a plurality of cage bars 95. The cage bars 95 extend from the annular portion 94 toward a second side in the axial direction. The clearance A1 between the annular portion 94 and a shoulder portion 97 of the outer ring 92 is reduced in size, and the clearance A2 between the annular portion 94 and a shoulder portion 99 of the inner ring 91 is also reduced in size.

In the rolling bearing described in JP 2009-281585 A, an axially-first-side (bearing-exterior-side) side surface 90 of an annular portion 94 of the cage 93 is an inclined surface that is inclined toward the first side in the axial direction as the inclined surface extends toward the outer ring 92 as depicted in FIG. 5. In this case, rotation of the bearing causes the lubricant in the bearing exterior to flow from the inner ring 91 toward the outer ring 92 due to a centrifugal force resulting from the rotation. On the first side in the axial direction with respect to the cage 93, the lubricant flows along the inclined side surface 90 as depicted by arrow F in FIG. 5. The lubricant having flowed along the side surface 90 has a component traveling toward the first side in the axial direction. Thus, the lubricant is less likely to enter the bearing interior through a clearance A1 between the annular portion 94 and the outer ring 92. This enables a reduction in the stirring resistance in the rolling bearing and thus in the rotational resistance to the rolling bearing.

In the rolling bearing depicted in FIG. 5, the lubricant having flowed along the inclined side surface 90 impinges on an inner peripheral surface of the shoulder portion 97 of the outer ring 92 and turns in another direction. Then, most of the lubricant flows toward the first side in the axial direction, with a portion of the lubricant traveling toward the second side in the axial direction. The lubricant flowing toward the second side in the axial direction flows directly between the annular portion 94 and the shoulder portion 97 of the outer ring 92 and enters the bearing interior, causing stirring resistance.

The lubricant may contain relatively hard foreign matter, for example, abrasion powder. In this case, when the lubricant in the bearing exterior is likely to enter the bearing interior, the foreign matter contained in the lubricant may be trapped, for example, between the outer ring and the rolling elements or between the inner ring and the rolling elements. The foreign matter may damage a raceway surface and the like, and peel-off or the like may start at the damaged point, shortening the life of the bearing. As described above, the lubricant in the bearing exterior is preferably made less likely to enter the bearing interior.

SUMMARY OF THE INVENTION

An object of the invention is to provide a rolling bearing that makes a lubricant in a bearing exterior less likely to enter a bearing interior through a clearance between an annular portion of a cage and an outer ring.

A rolling bearing in an aspect of the invention includes an inner ring, an outer ring, a plurality of rolling elements provided between the inner ring and the outer ring, and an annular cage that holds the rolling elements at intervals in a circumferential direction. The cage has an annular portion provided on a first side in an axial direction with respect to the rolling elements and a plurality of cage bars extending from the annular portion toward a second side in the axial direction. Pockets that house the rolling elements are each formed between the cage bars adjacent to each other in a circumferential direction. An axially-first-side side surface of the annular portion has a first surface that is inclined toward the first side in the axial direction as the first surface extends outward in a radial direction and a second surface provided outward of the first surface in the radial direction and positioned on the second side in the axial direction with respect to an extended virtual plane of the first surface.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
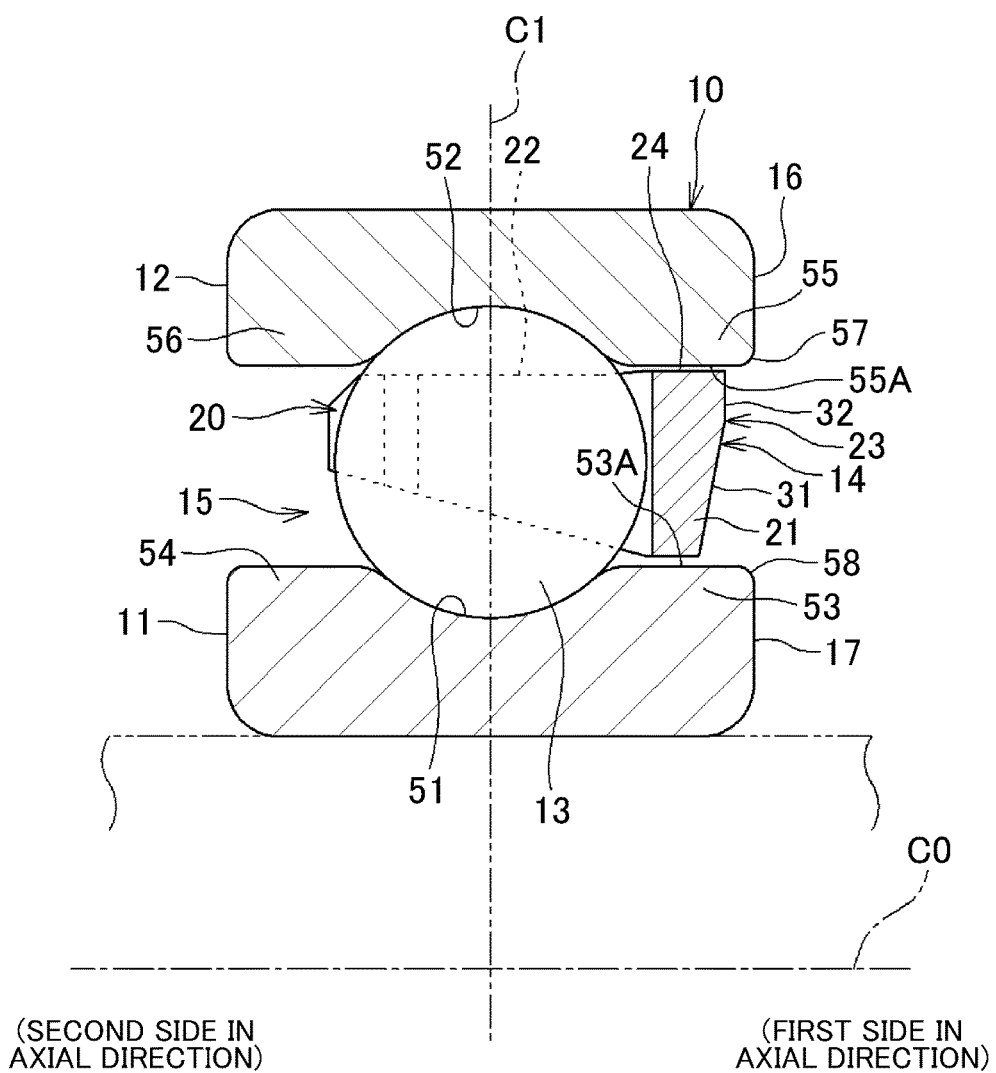
FIG. 1 is a sectional view depicting an embodiment of a rolling bearing in the invention.

An embodiment of the present invention will be described below based on the drawings. FIG. 1 is a sectional view depicting an embodiment of a rolling bearing in the invention. A rolling bearing 10 includes an inner ring 11, an outer ring 12, a plurality of rolling elements, and a cage 14 that holds the rolling elements at intervals in a circumferential direction. The rolling elements are provided between the inner ring 11 and the outer ring 12. The cage 14 holds the balls 13 at intervals in the circumferential direction. In the present embodiment, the rolling elements are balls 13. The rolling bearing 10 depicted in FIG. 1 is a deep groove ball bearing. The inner ring 11, the outer ring 12, and the balls 13 are formed of bearing steel or carbon steel. The cage 14 in the present embodiment is formed of resin and can be manufactured by injection molding using a mold. Since the cage 14 is formed of resin, a bent surface shape defined by a first surface 31 and a second surface 32 and described below can be easily formed.

The inner ring 11 is a cylindrical member and is provided with a groove-like inner-ring raceway surface 51 on an outer periphery of the inner ring 11 so that the balls 13 can roll on the inner-ring raceway surface 51. The inner ring 11 is provided with a first shoulder portion 53 on a first side in an axial direction with respect to the inner-ring raceway surface 51. The inner ring 11 is provided with a second shoulder portion 54 on a second side in the axial direction with respect to the inner-ring raceway surface 51. In the present embodiment, the shoulder portions 53, 54 have the same outside diameter. The inner ring 11 has a protruding round surface 58 between an axially-first-side side surface 17 and an outer peripheral surface 53A of the shoulder portion 53. The side surface 17 and the outer peripheral surface 53A are continuous with each other via the protruding round surface 58.

The outer ring 12 is a cylindrical member and is provided with a groove-like outer-ring raceway surface 52 on an inner periphery of the outer ring 12 so that the balls 13 can roll on the outer-ring raceway surface 52. The outer ring 12 is further provided with a first shoulder portion 55 on the first side in the axial direction with respect to the outer-ring raceway surface 52 and a second shoulder portion 56 on the second side in the axial direction with respect to the outer-ring raceway surface 52. In the present embodiment, the shoulder portions 55, 56 have the same bore diameter. The outer ring 12 has a protruding round surface 57 between an axially-first-side side surface 16 and an inner peripheral surface 55A of the shoulder portion 55. The side surface 16 and the inner peripheral surface 55A are continuous with each other via the protruding round surface 57.

The balls 13 are provided in an annular space 15 formed between the inner ring 11 and the outer ring 12. Rotation of the rolling bearing 10 (in the present embodiment, rotation of the inner ring 11) allows the balls 13 held by the cage 14 to roll on the inner-ring raceway surface 51 and the outer-ring raceway surface 52.

Figure 2:
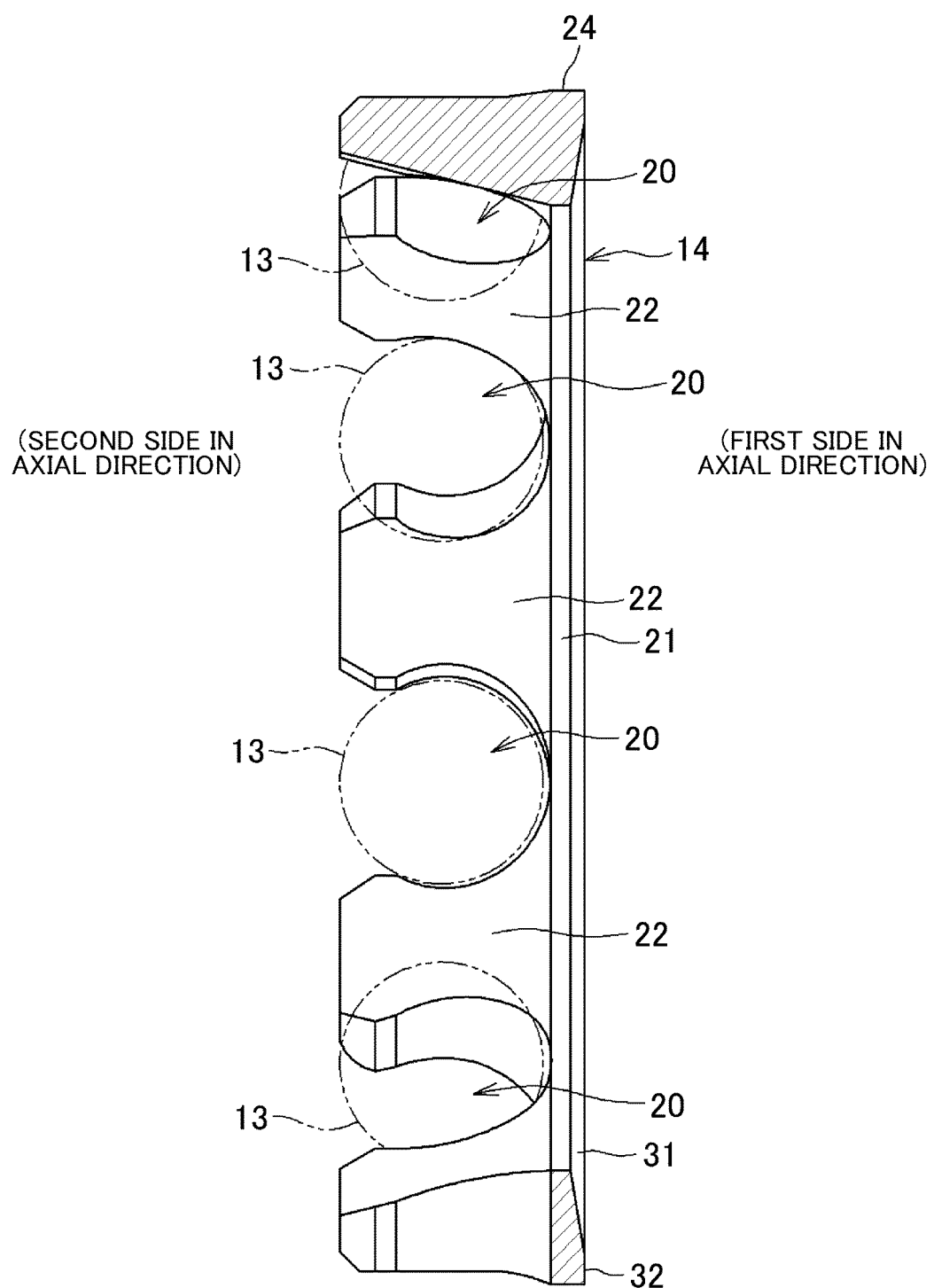
FIG. 2 is a diagram illustrating a cage cut into halves.
Figure 3:
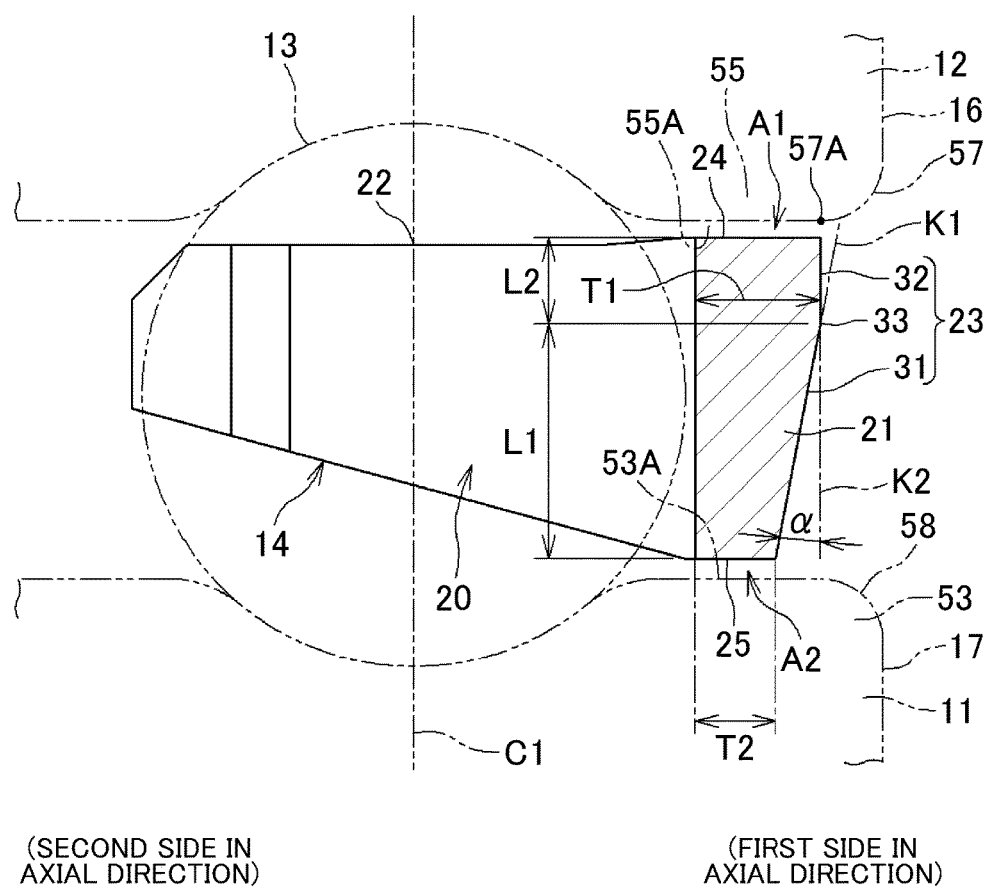
FIG. 3 is a sectional view depicting a part of a cage.

FIG. 2 is a diagram illustrating the cage 14 cut into halves. FIG. 3 is a sectional view depicting a part of the cage 14. The cage 14 can hold the balls at predetermined (regular) intervals along the circumferential direction. Thus, a plurality of the pockets 20 is formed in the cage 14 along the circumferential direction to hold the respective balls 13. The cage 14 in the present embodiment is what is called a snap cage. The cage 14 has an annular portion 21 and a plurality of cage bars 22. The annular portion 21 is provided at a first side (in FIG. 1 and FIG. 2, a right side) of the balls 13 in the axial direction. The cage bars 22 extend from the annular portion 21 toward a second side (in FIG. 1 and FIG. 2, a left side) in the axial direction. Each of the pockets 20 is a space on the second side in the axial direction with respect to the annular portion 21 between a pair of the cage bars 22, 22 adjacent to each other in the circumferential direction.

In the present embodiment, the axial direction is parallel to a center line C0 (see FIG. 1) of the rolling bearing 10. The center line is referred to as the bearing center line C0. Center lines of the inner ring 11, the outer ring 12, and the cage 14 coincide with the bearing center line C0. A radial direction of the rolling bearing 10 is referred to as a bearing radial direction. In FIG. 1 and FIG. 3, a virtual line C1 depicted by a long dashed double-short dashed line is orthogonal to the bearing center line C0, and a direction along the virtual line C1 corresponds to the bearing radial direction.

In FIG. 3, an outer peripheral surface 24 of the annular portion 21 faces the inner peripheral surface 55A of the shoulder portion 55 of the outer ring 12 via a slight clearance A1. This makes a lubricant in a bearing exterior on the first side in the axial direction less likely to enter a bearing interior. The bearing interior is an area between the inner ring 11 and the outer ring 12 where the balls 13 are present. The cage 14 is displaced in the radial direction to enable the outer peripheral surface 24 of the annular portion 21 to come into contact with the inner peripheral surface 55A of the shoulder portion 55. In other words, the cage 14 in the present embodiment is guided and positioned in the radial direction by the outer ring 12.

The inner peripheral surface 25 of the annular portion 21 faces the outer peripheral surface 53A of the shoulder portion 53 of the inner ring 11 via a slight clearance A2. This makes a lubricant in a bearing exterior on the first side in the axial direction less likely to enter a bearing interior. When the cage 14 is displaced in the radial direction, the inner peripheral surface 25 of the annular portion 21 is inhibited from coming into contact with the outer peripheral surface 53A of the shoulder portion 53.

An axially-first-side side surface 23 of the annular portion 21 has a first surface 31 formed on a radially inner side of the side surface 23 and a second surface 32 formed on a radially outer side of the side surface 23. A combination of the first surface 31 and the second surface 32 has a bent shape bent at a boundary 33 therebetween, and the first surface 31 and the second surface 32 are continuous with each other. In other words, the side surface 23 of the annular portion 21 is bent at the boundary 33 between the first surface 31 and the second surface 32.

The first surface 31 is inclined toward the first side in the axial direction as the first surface 31 extends outward in the radial direction (in other words, toward the outer ring 12). The annular portion 21 is shaped like a circular ring, and the first surface 31 is a circular-ring-like tapered surface. The second surface 32 is formed outward of the first surface 31 in the radial direction and positioned on the second side in the axial direction with respect to an extended virtual plane K1 of the first surface 31 (in other words, positioned closer to the balls 13 than the extended virtual plane K1). Since the annular portion 21 is shaped like a circular ring, the second surface 32 is shaped like a circular ring. In particular, in the present embodiment, the second surface 32 is a surface shaped like a circular ring along an orthogonal virtual plane K2 orthogonal to the bearing center line C0 (FIG. 1).

In FIG. 3, the first surface 31 has an inclination angle $\alpha$ to the orthogonal virtual plane K2. The second surface 32 is located on the orthogonal virtual plane K2, and thus has an inclination angle of zero to the orthogonal virtual plane K2.

The first surface 31 intersects the second surface 32 in a radially outward area of the side surface 23 of the annular portion 21. In other words, the boundary 33 is formed in the radially outward area of the side surface 23. The first surface 31 has a radial dimension L1, and the second surface 32 has a radial dimension L2. The first surface 31 is longer than the second surface 32 in the radial direction (L1>L2). Consequently, the first surface 31 is larger than the second surface 32.

As described above, the first surface 31 is inclined at the angle $\alpha$ to the orthogonal virtual plane K2, and the extended virtual plane K1 of the first surface 31 is also inclined at the angle α to the orthogonal virtual plane K2. The extended virtual plane K1 of the first surface 31 intersects the outer ring 12 on the first side in the axial direction with respect to a start point 57A (on the first side in the axial direction) of the round surface 57 of the outer ring 12. In other words, the extended virtual plane K1 intersects the round surface 57.

Figure 4:
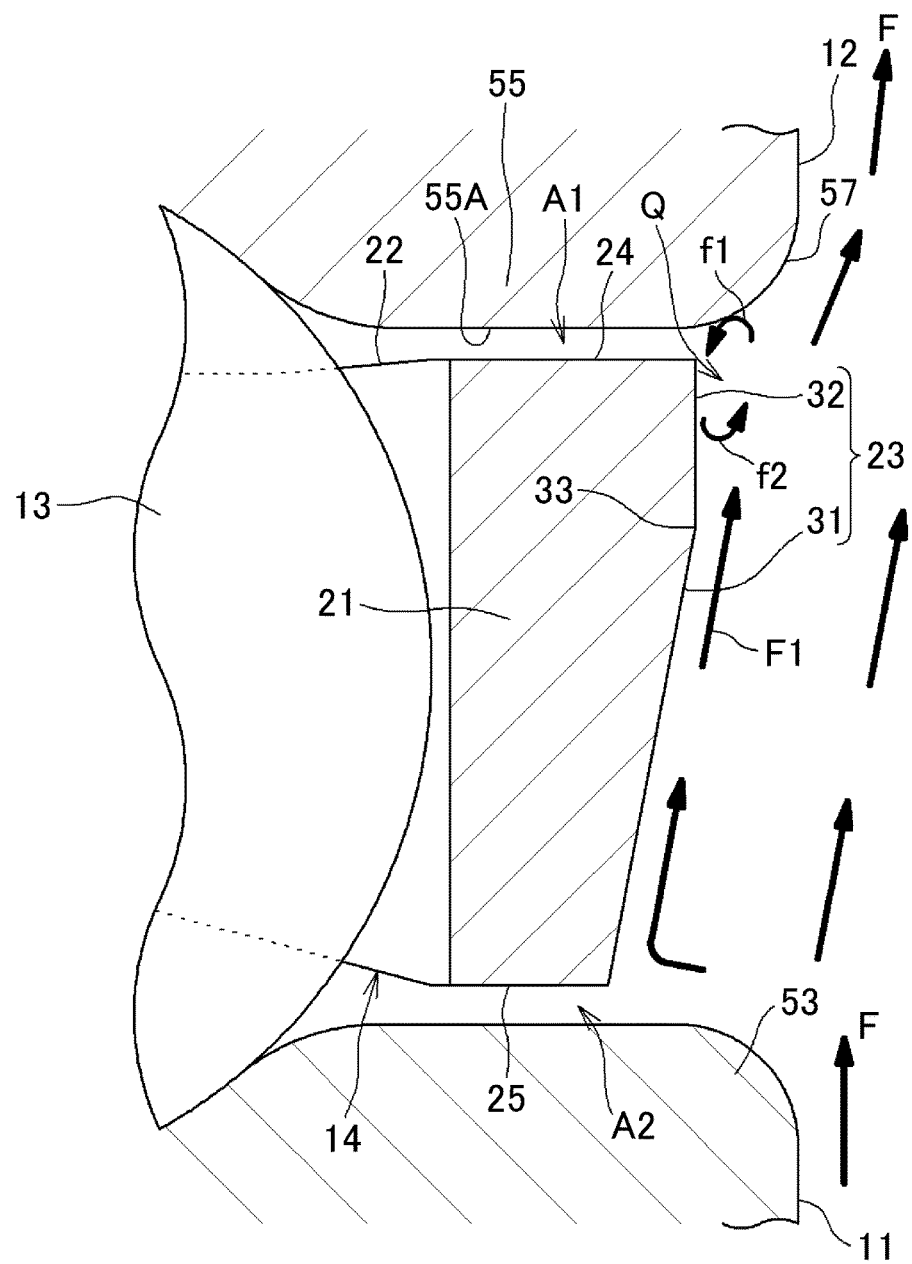
FIG. 4 is an enlarged sectional view depicting an annular portion and a periphery thereof.
Figure 5:
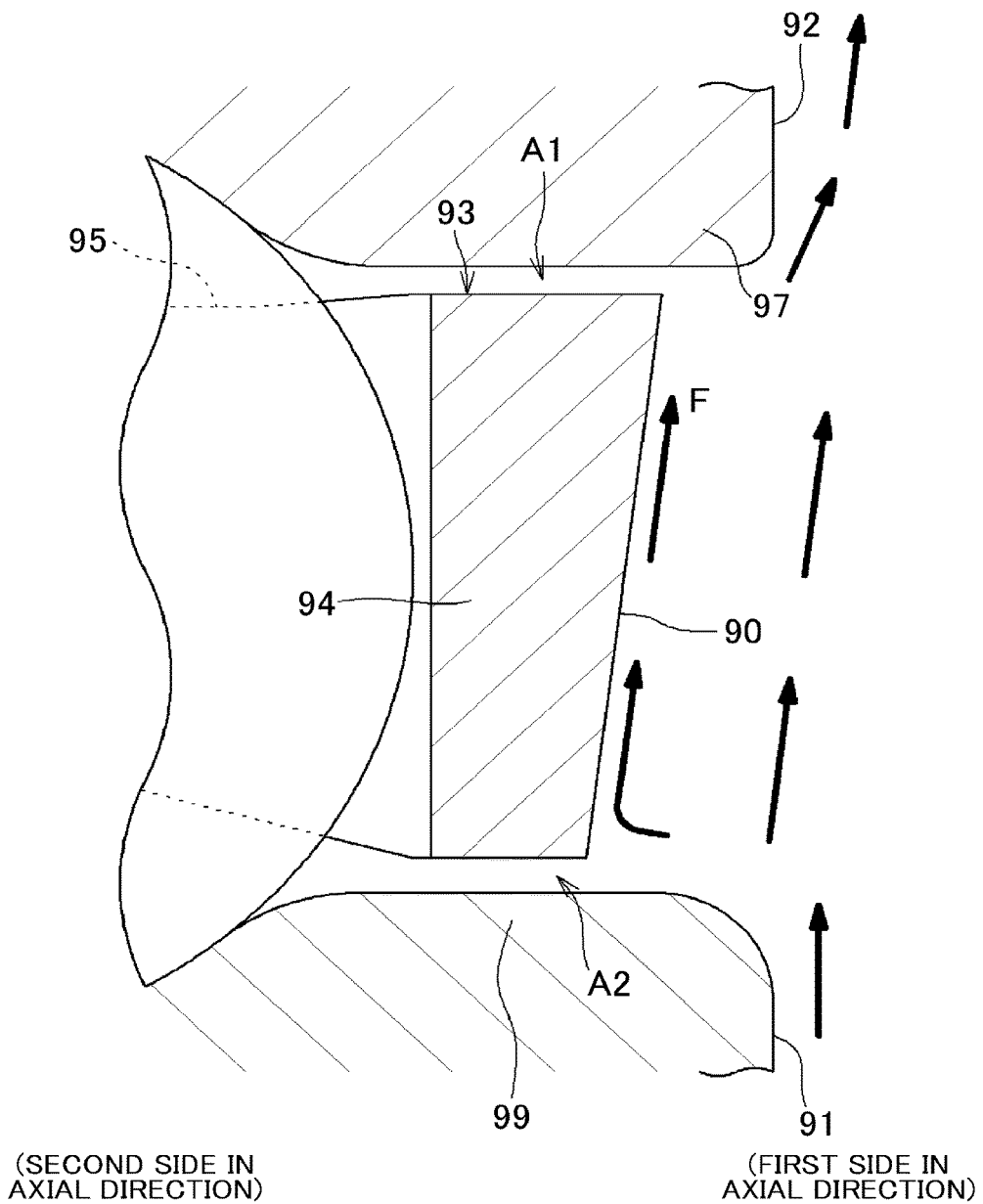
FIG. 5 is a sectional view of a conventional rolling bearing.

In the rolling bearing 10 configured as described above (see FIG. 1), rotation of the inner ring 11 allows the balls 13 and the cage 14 to also rotate in the same direction. This rotation allows the lubricant present on the first side of the rolling bearing 10 in the axial direction to flow from the inner ring 11 toward the outer ring 12 due to a centrifugal force resulting from the rotation, as depicted by arrow F in FIG. 4. On the first side in the axial direction with respect to the annular portion 21 of the cage 14, the lubricant flows along the inclined first surface 31 and then departs from the side surface 23 at the boundary 33 between the first surface 31 and the second surface 32. The lubricant flowing along the first surface 31 has a component (speed component) traveling outward in the radial direction and a component (speed component) traveling toward the first side in the axial direction. This makes the lubricant less likely to enter the bearing interior through the clearance A1 between the annular portion 21 and the outer ring 12 (shoulder portion 55).

In particular, in the present embodiment, the first surface 31 is formed to be longer than the second surface 32 in the radial direction. Thus, the first surface 31 is large enough to allow the lubricant to flow stably toward the outer ring 12 along the first surface 31. Therefore, the lubricant can be easily provided with the component traveling toward the first side in the axial direction.

In the present embodiment, the cage 14 is guided and positioned in the radial direction by the outer ring 12. Thus, the outer peripheral surface 24 of the annular portion 21 is a contact surface that faces the inner peripheral surface 55A of the shoulder portion 55 of the outer ring 12 via the clearance A1 and that can come into contact with the inner peripheral surface 55A. Consequently, the clearance A1 is small enough to make the lubricant in the bearing exterior even less likely to enter the bearing interior through the clearance A1 between the outer peripheral surface 24 of the annular portion 21 and the inner peripheral surface 55A of the shoulder portion 55.

At the axially-first-side side surface 23 of the annular portion 21, a space Q is formed between the second surface 32 and the flow of the lubricant having departed from the side surface 23 at the boundary 33. Thus, even when the lubricant having departed from the side surface 23 at the boundary 33 impinges on the shoulder portion 55 and then flows toward the second side in the axial direction (see arrow f1 in FIG. 4), for example, an opportunity is obtained in which a portion of the lubricant eddies in the space Q as depicted by arrow f2 in FIG. 4 and is caught in the flow (F1) of the lubricant having departed from the side surface 23 at the boundary 33. This enables a reduction in the amount of lubricant entering the bearing interior through the clearance A1 between the annular portion 21 and the outer ring 12 (shoulder portion 55).

As described with reference to FIG. 3, the extended virtual plane K1 of the first surface 31 intersects the outer ring 12 on the first side in the axial direction with respect to the start point 57A of the round surface 57 of the outer ring 12. The inclination angle α of the first surface 31 is, set so as to achieve the above-described intersection. Thus, most of the lubricant having flowed along the first surface 31 and departed from the side surface 23 at the boundary 33 impinges on the round surface 57. When flowing along the round surface 57, the lubricant is likely to flow toward the first side in the axial direction and is unlikely to flow toward the bearing interior. As a result, the lubricant can be more effectively restrained from entering the bearing interior.

An increased inclination angle α of the first surface 31 increases the component of the lubricant flow on the first side in the axial direction, making the lubricant less likely to enter the bearing interior through the clearance A1 located closer to the outer ring 12. However, an increased inclination angle α reduces an axial dimension T2 (see FIG. 3) of the inner peripheral surface 25 of the annular portion 21. In this case, the lubricant is likely to enter the bearing interior through the clearance A2 located closer to the inner ring 11. Thus, in the present embodiment, the axial dimension T2 of the inner peripheral surface 25 is restrained from being reduced. In other words, when the maximum value of the axial dimension of the annular portion 21 is denoted by T1 and the axial dimension of the inner peripheral surface 25 is denoted by T2, a relationship between the maximum value T1 of the axial dimension and the axial dimension T2 of the inner peripheral surface 25 is represented by $T2 \geq T1/2$. Consequently, the axial dimension T2 of the inner peripheral surface 25 is restrained from being reduced. The inclination angle α of the first surface 31 is set so as to keep the radial dimension L1 of the first surface 31 large with the above-described relationship maintained. Specifically, the inclination angle α is preferably set within the range from 10° to 15°.

Now, an operation of assembling the cage 14 to the rolling bearing 10 (see FIG. 1) will be described. The operation is performed as follows. First, the plurality of balls 13 is interposed between the inner ring 11 and the outer ring 12. Then, the cage 14 is moved closer to the balls 13 from the first side in the axial direction, and the annular portion 21 of the cage 14 is pushed from the first side toward the second side in the axial direction to house the balls 13 in the pockets 20 in the cage 14. At this time, the annular portion 21 is pushed toward the second side in the axial direction using a jig or the like, and particularly the axially-first-side side surface 23 of the annular portion 21 is pushed. A direction in which the cage 14 is pushed is parallel to the bearing center line C0.

Thus, in the present embodiment, the side surface 23 has the second surface 32, which is a surface shaped like a circular ring along the orthogonal virtual plane K2 orthogonal to the bearing center line C0 as described above. Consequently, the second surface 32, which is shaped like a circular ring, can be used as a surface to be pushed, and is pushed in a direction parallel to the bearing center line C0. This facilitates attachment of the cage 14.

As described above, the rolling bearing 10 in the present embodiment makes the lubricant present in the bearing exterior on the first side in the axial direction less likely to enter the bearing interior through the clearance between the annular portion 21 of the cage 14 and the outer ring 12 when the bearing rotates. This enables a reduction in stirring resistance caused by the lubricant in the bearing interior and thus in rotational resistance to the rolling bearing 10.

The lubricant may contain relatively hard foreign matter, for example, abrasion powder. In this case, when the lubricant in the bearing exterior is likely to enter the bearing interior, the foreign matter contained in the lubricant may be trapped, for example, between the outer-ring raceway surface 52 and the balls 13 or between the inner-ring raceway surface 51 and the balls 13. The foreign matter trapped between the raceway surfaces 51, 52 and the balls 13 may damage the raceway surfaces 51, 52, and peel-off or the like may start at the damaged point, shortening the life of the bearing. However, in the rolling bearing 10 in the present embodiment, since the lubricant is unlikely to enter the bearing interior, the foreign matter is also unlikely to enter the bearing interior. Thus, possible damage to the raceway surfaces 51, 52 and the like can be prevented as appropriately as possible.

The embodiment disclosed above is illustrative in every respect and is not restrictive. In other words, the rolling bearing in the invention is not limited to the illustrated form but may be in any other form within the scope of the invention. In the above-described embodiment, the cage 14 is what is called a snap ring in which the annular portion 21 is provided only on the first side in the axial direction. However, the cage may be of a different type, and although not depicted in the drawings, may also include an annular portion on the second side in the axial direction. In the above description, the rolling elements are the balls 13. However, the rolling elements may be cylindrical rollers or tapered rollers.

In the above-described embodiment (see FIG. 3), the axially-first-side side surface 23 of the annular portion 21 of the cage 14 has the second surface 32, which is shaped along the orthogonal virtual plane K2. However, the second surface 32 may also be inclined to the orthogonal virtual plane K2. However, also in this case, the second surface 32 is positioned on the second side in the axial direction with respect to the extended virtual plane K1 of the first surface 31.

In the above-described embodiment (see FIG. 3), the axially-first-side side surface 23 of the annular portion 21 includes two surfaces, the first surface 31 and the second surface 32. However, although not depicted in the drawings, the side surface 23 has three surfaces (three or more surfaces). For example, another preferred configuration will be described with reference to FIG. 3. The second surface 32 is a tapered surface that is slightly inclined to the orthogonal virtual plane K2, and a third surface is formed outward of the second surface 32 in the radial direction. A bend angle is formed at the boundary between the first surface 31 and the second surface 32 and also at a boundary between the second surface and the third surface. Also in this case, the second surface and the third surface are positioned on the second side in the axial direction with respect to the extended virtual plane K1 of the first surface 31.

The invention makes the lubricant in the bearing exterior less likely to enter the bearing interior through the clearance between the annular portion of the cage and the outer ring, enabling a reduction in the stirring resistance caused by the lubricant and thus in the rotational resistance to the rolling bearing.

What is claimed is:

1. A rolling bearing comprising:
an inner ring;
an outer ring;
a plurality of rolling elements provided between the inner ring and the outer ring; and
an annular cage that holds the rolling elements at intervals in a circumferential direction, wherein
the cage has an annular portion provided on a first side in an axial direction with respect to the rolling elements and a plurality of cage bars extending from the annular portion toward a second side in the axial direction, and pockets that house the rolling elements are each formed between the cage bars adjacent to each other in the circumferential direction,
an axially-first-side side surface of the annular portion has a first surface that is inclined toward the first side in the axial direction as the first surface extends outward in a radial direction and a second surface provided outward of the first surface in the radial direction and positioned on the second side in the axial direction with respect to an extended virtual plane of the first surface,
the first surface is longer than the second surface in the radial direction,
the second surface is shaped like a circular ring along an orthogonal virtual plane orthogonal to a bearing center line, and
the second surface terminates, at one end, at an outer peripheral surface of the annular portion.

2. The rolling bearing according to claim 1, wherein the outer ring has a protruding round surface between the axially-first-side side surface of the outer ring and an inner peripheral surface of the outer ring, and
the extended virtual plane of the first surface intersects the outer ring on the first side in the axial direction with respect to a start point of the round surface.

3. The rolling bearing according to claim 1, wherein an outer peripheral surface of the annular portion is a contact surface that faces an inner peripheral surface of a part of the outer ring via a clearance and that comes into contact with the inner peripheral surface.

* * * * *